Patented Mar. 13, 1934

1,951,082

UNITED STATES PATENT OFFICE 1,951,082

AZO-DYESTUFFS AND PROCESS OF MAKING SAME

Gérald Bonhôte, Basel, and Max Schmid, Riehen, near Basel, Switzerland, assignors to Society of Chemical Industry in Basle, Basel, Switzerland No Drawing. Application November 9, 1932, Serial No. 641,933. In Switzerland November 13, 1931

28 Claims. (Cl. 260—76)

The present invention relates to the manufacture of new azo-dyestuffs. It comprises the process of making these azo-dyestuffs and the azo-dyestuffs themselves.

The arylides deriving, on the one part, from carboxylic acids the COOH-groups of which are directly linked to a ring, and which, due to the presence of a $COCH_2$-group, are capable of coupling (as in the case of the carboxylic acids of 1-aryl-pyrazolones containing their carboxylic group bound, be it to the aryl nucleus, be it to the pyrazolone nucleus, or to both nuclei), and, on the other part, from polynucleal aromatic amines, have not hitherto been described. These arylides correspond to the general formula

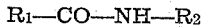

$$R_1\text{—}CO\text{—}NH\text{—}R_2$$

wherein $R_1$ is the radical of the carboxylic acid containing the group $COCH_2$, and $R_2$ the radical of the polynuclear amine.

It has now been found that these arylides are obtained by condensing the carboxylic acids with the polynuclear aromatic amines defined below. This condensation is preferably effected according to known methods, for example by converting the carboxylic acids into the corresponding carboxylic acid chlorides, and condensing the chlorides thus obtained with the polynuclear aromatic amines. The condensation may also be effected by causing condensing agents, such as the trichloride or oxychloride of phosphorus etc., to react on a mixture of the carboxylic acid and the aromatic amine in an indifferent solvent, such as toluene, chlorobenzene, or a tertiary base, such as pyridine, dimethylaniline or diethylaniline.

These new arylides are of great industrial importance.

Among the carboxylic acids which come into consideration for carrying out the present process the following may be mentioned:

1. The pyrazolone carboxylic acids which are derived from acetoacetic esters and the hydrazines obtained in known manner from aminocarboxylic acids, such as the 1-aminobenzene-2-, or 3- or 4-carboxylic acids, as well as from the different chloro- and methylaminobenzoic acids, such as for example 5 - chloro - 2 - aminobenzene-1-carboxylic acid, 2 - chloro - 3 - aminobenzene-1-carboxylic acid, 4-chloro-3-aminobenzene-1-carboxylic acid, 5-chloro-3-aminobenzene-1-carboxylic acid, 6-chloro-3-aminobenzene-1-carboxylic acid, 2-chloro-4-aminobenzene-1-carboxylic acid, or 2-methyl - 4 - aminobenzene-1-carboxylic acid, 2-methyl - 6 - aminobenzene-1-carboxylic acid, 4-methyl - 2 - aminobenzene-1-carboxylic acid, 4-methyl - 3 - aminobenzene-1-carboxylic acid, as well as from the chlorotoluidine carboxylic acids, such as, for examples, 6-chloro-4-methyl-3-aminobenzene - 1 - carboxylic acid, 5-chloro-4-methyl - 2 - aminobenzene-1-carboxylic acid, as well as from the alkyl, aralkyl, and aryl ethers of aminophenol carboxylic acids, such as, for example, 3-amino-4-methoxy-1-carboxylic acid, the phenyl ether of 2-amino-1-hydroxybenzene-4-carboxylic acid, or the substitution products thereof, etc.;

2. The pyrazolone carboxylic acids which are derived from oxalacetic esters and the hydrazines corresponding to the general formula

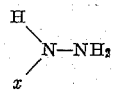

in which $x$ means a hydrogen atom or a substituent from a group of substituents comprising alkyl, aralkyl or aryl residues. Such hydrazines are for instance the hydrazine itself ($NH_2$-$NH_2$) or the alkyl hydrazines, such as methyl or ethyl hydrazine, benzyl hydrazine, phenyl hydrazine, or any other aromatic primary hydrazine;

3. The acetyl acetic arylides containing a COOH-group in the aryl nucleus, such as the arylides which derive from the ortho-, meta-, and para-aminobenzoic acids;

4. Other suitable carboxylic acids, such as the aryl barbituric acids containing the carboxyl-group in the aromatic nuceli, acids of the type of the benzoylacetic-ortho-carboxylic acid, etc.

Among the polynuclear amines which come into question as parent materials for the present invention there may be named the amines the nuceli of which are purely aromatic, such as α- and β-naphthylamine, the naphthylenediamines, for example 1:5-naphthylenediamine, the aminonaphthols, the 2-aminoanthracene and 1-aminoacenaphthene, etc., i. e., polynuclear amines whose nuceli are condensed the one with the other, or polynuclear amines whose nuclei are united by a linkage consisting either of a simple link or an atom or a grouping of atoms. Among the polynuclear amines whose nuclei are united by a simple link there may be named the 4:4'-diaminodiphenyls, such as benzidine, tolidine, dianisidine, diphenetidine. Among the polynuclear amines whose nuclei are united by an atom or a grouping of atoms there may be named the diphenylethers containing one or several $NH_2$-groups, such as the 2-amino-1:1'-diphenyl-ether or the 4:4'-diamino-1:1'-diphenylether, the 4:4′:4″-triamino-triphenylmethane, the diaminodiarylmethanes, the mono-, di-, tri and tetra-aminodiarylureas. Further the amines which besides an aromatic nucleus contain another nucleus, such as for example the aminoarylpyrazolones, the aminoarylthiazoles, such as the dehydrothiotoluidine, the homologues, analogues and sulfonic acid derivatives thereof, or also amino compounds of another character, such as the aromatic tetrahydronaphthylamines, the arylamides prepared from 1 mol of a diamine of the benzene series and 1-mol of a suitable carboxylic acid, such as benzoic acid, the hydroxybenzoic acids, naphthoic acids, hydroxynaphthoic acids, pyrazolone carboxylic acids, the aminoazo compounds, aminothiazines, oxazines, azines, etc. Other amino compounds may also be used, for example the condensation products containing amino groups which are inter alia obtained by condensation of aromatic diamines with heterocyclic compounds containing mobile halogen atoms, such as cyanuric chloride, dichloroquinazoline, tribromopyrimidine, etc., products which as is known may contain a great number of $NH_2$-groups.

According to the choice of the initial products mentioned above arylides of different constitution are obtained.

Thus the arylides which are obtained from 5-pyrazolone carboxylic acids correspond to the general formula

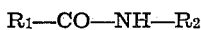
$$R_1—CO—NH—R_2$$

cited in the third paragraph above, wherein $R_1$ stands for the radical of the pyrazolone carboxylic acid, it being indifferent whether the carboxyl group is in the pyrazolone nucleus or, if one is present, in the phenyl nucleus, and $R_2$ for the residue of the polynuclear amine.

According to the nature of the pyrazolone carboxylic acid further more specific formulas may be derived from this general formula. Thus the arylides from pyrazolone carboxylic acids mentioned under position 1 above correspond to the following general formula deriving from that of the third paragraph hereinbefore

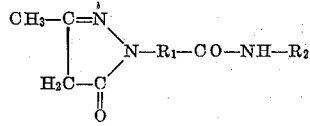

wherein $R_1$ stands for the aromatic radical of the aromatic carboxylic acid used for the production of the pyrazolone, and $R_2$ for the radical of the polynuclear aromatic amine.

The arylides which derive from the pyrazolone carboxylic acids mentioned under position 2 above correspond to the following particular case of the general formula

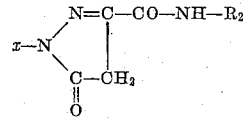

disclosed in the third paragraph above, wherein $x$ stands for hydrogen or a substituent from a group of substituents comprising alkyl, aralkyl, or aryl, and $R_2$ for the radical of the polynuclear aromatic amine, and in which the grouping

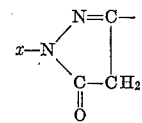

corresponds to the radical $R_1$ of the general formula stated in the third paragraph.

If one of the acids mentioned under position 3 above is used, the formula of the third paragraph of this specification assumes the following aspect

$$A—R_3—CO—NH—R_2$$

wherein A stands for the radical which contains the $CO—CH_2$-group capable of coupling, $R_3$ for the aromatic nucleus to which the group A and the $CO—NH—R_2$-group are linked, and $R_2$ for the radical of the polynuclear aromatic amine.

If for the polynuclear aromatic amine such an amine is chosen which contains two or more amino-groups, there are obtained products for which the formula of the third paragraph of this description has developed to the following formula

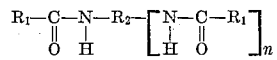

wherein $R_1$ again stands for the radical of the cyclic carboxylic acid carrying the $CH_2—CO$-group, and $R_2$ for the radical of the polynuclear aromatic amine, and in which $n$ stands for a whole number which corresponds to the number of $NH_2$-groups which are present in the polynuclear amine.

All these arylides have the common characteristic of being soluble in caustic alkalies and capable of coupling with diazo-compounds. They constitute in a dry state colorless to lightly colored powders.

According to their composition the new arylides may be used for the most various purposes. In a general manner they yield soluble dyestuffs when coupled with sulfonated diazo components. These dyestuffs may be used for the dyeing of animal fibers (wool and silk), vegetable fibers (cotton, linen, jute etc.), or artificial fibers (artificial silk produced on the basis of regenerated cellulose). If the diazo components contain an OH-group or a COOH-group in ortho position to the diazo-group, there are obtained dyestuffs capable of being transformed in substance, in the dyeing bath, or on the fiber, into metalliferous compounds which dye the fiber shades of excellent fastness properties.

These new dyestuffs correspond to the general formula

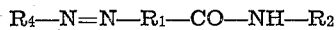
$$R_4—N=N—R_1—CO—NH—R_2$$

wherein $R_1$ and $R_2$ have the above stated significations, and $R_4$ stands for the aromatic radical of the diazotizing component. According to the nature of the arylide used for coupling, various special cases may be derived from this general formula, of which the most important are the following:—

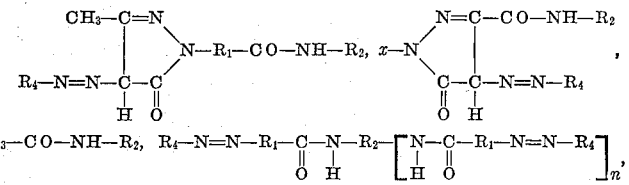

in which formulas $R_4$ always stands for the aromatic radical of the diazo component, $R_1$ for the radical of the cyclic carboxylic acid carrying the $CH_2$—CO-group, $R^2$ for the radical of the polynuclear amine, A for the radical containing the $CH_2$—$CO_2$-group capable of coupling, $R_3$ for the aromatic nucleus to which the groups A and CO—NH—$R_2$ are linked, $x$ for H or a substituent from a group of substituents comprising alkyl, aralkyl, or aryl, and $n$ for a whole number which corresponds to the number of $NH_2$-groups present in the polynuclear aromatic amine, if such an amine has been used for the production of the arylide.

All these dyestuffs, indifferent whether they are sulfonated or unsulfonated, or whether or not they contain complexly bound metals, constitute in a dry, finely subdivided state yellow to orange to brown to red powders which dissolve in solvents of the group of solvents comprising water and organic solvents to yellow to orange to brown to red solutions. The dyeings produced with these dyestuffs on textiles range from greenish yellow via golden yellow up to orange, red-orange, brown and red. Many of these dyeings, as already mentioned, are characterized by remarkable fastness properties.

In case these new dyestuffs are metalliferous, the metal may be copper or chromium. But also other metals, such as iron, manganese, nickel, cobalt, molybdenum, cerium, etc., may come into consideration, that is to say, all metals the oxides or hydroxides of which may combine with dyestuffs to complex compounds.

The arylides obtained according to the process of the present invention vary in their affinity for the different fibers. In general those which have been prepared with monamines are distinguished by their affinity for the animal fiber, whereas those which have been obtained by means of diamines are distinguished by their affinity for the vegetable fiber or the fiber from regenerated cellulose. Those among the latter which have been obtained with diamines having a pronounced affinity for cotton, such as benzidine, tolidine, dianisidine, etc., are particularly valuable. If the fibers prepared with these arylides are treated with diazotized, preferably unsulfonated, amines, there are obtained shades which are remarkable both for their beauty and their fastness.

The following examples illustrate the present invention without, however, limiting the same, the Examples 1 to 4 illustrating the production of the coupling components necessary for the present invention. The parts are by weight.

*Example 1*

A stirring vessel containing a mixture of 200 parts of diethylaniline and 100 parts of pyridine is charged with 24 parts of 1-(3'-carboxy-phenyl)-3-methyl-5-pyrazolone and 14 parts of β-naphthylamine; the mixture is heated to about 50° C. and there are gradually added 8 parts of phosphorus trichloride. The temperature is raised to about 130–140° C. and kept at this point for about 2–3 hours. The mass is then introduced into dilute hydrochloric acid and the whole is subsequently filtered by suction; the solid matter is suspended in a dilute sodium carbonate solution, the adherent tertiary base is expelled by steam distillation, the arylide is dissolved in a dilute sodium hydroxide solution, and precipitated by the addition of dilute acid after the solution has been clarified. The arylide thus obtained constitutes when dried a whitish powder which is easily soluble in aqueous solutions of caustic alkalies; it is absorbed by cotton, particularly in the presence of electrolytes. The new product very probably corresponds to the formula

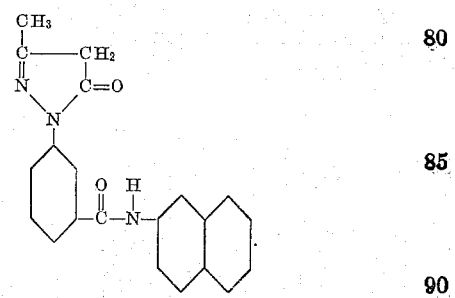

The condensation may be conducted in a similar manner with other tertiary bases, or with the use of indifferent solvents, such as toluene, etc.

One proceeds in an analogous manner with other carboxylic acids, such as, for instance, with 1-(4'-carboxy-phenyl)-3-methyl-5-pyrazolone, or by using instead of β-naphthylamine an aminonaphthol, such as, for instance, the 2:7- or the 1:7-aminonaphthol, or also the dehydrothiotoluidine sulfonic acid.

If pyrazolones are used which are derived from the oxalacetic ester, other stoichiometric proportions must of course be chosen. The same is the case by using instead of pyrazolone other carboxylic acids, such as for example the arylide obtained by condensation of acetylacetic acid and meta-aminobenzoic acid.

*Example 2*

A stirring vessel is charged with 48.8 parts of 1-phenyl-5-pyrazolone-3-carboxylic acid, 43.9 parts of the phenylether of 4-chloro-2-aminophenol, and 300 parts of chlorobenzene. The mixture is heated to 130–135° C., allowed to cool down to about 70° C., and there are added within 30 minutes dropwise 12 parts of phosphorus trichloride. The temperature is again raised to 130–135° C. and maintained at this point for 20 hours. The mass is then poured into water, 5 parts of sodium carbonate added to the mixture, and the chlorobenzene expelled by steam distillation. The solid matter is dissolved in dilute sodium hydroxide solution while hot, filtered, and precipitated by the addition of dilute acid. The new condensation product thus obtained is, when dry, a feebly colored powder, which readily dissolves in caustic alkalies. Very fast dyeings are obtained by impregnating wool with its caustic alkali solutions and developing it in suitable diazotizing solutions. The new product probably corresponds to the formula

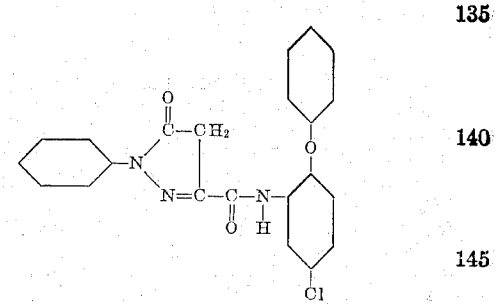

In a similar manner one proceeds with other amines, such as the β-naphthylamine or the 2:7- or 1:7-aminonaphthol. If diamines are used, such as benzidine or 1:5-naphthylenediamine, the stoichiometric proportions may be varied according to the purpose aimed at (condensation with 1 or with 2 amino groups).

Example 3

A stirring vessel is charged with 80 parts of diethylaniline, 44 parts of 1-(3'-carboxy-phenyl)-3-methyl-5-pyrazolone and 18.4 parts of benzidine. This mixture is heated to about 100° C. and 13.5 parts of phosphorus trichloride are then slowly added, whilst ensuring that the temperature does not rise above 110–115° C. This temperature is maintained for about 4 hours, whereupon the mass of the reaction is introduced into dilute hydrochloric acid, and filtered by suction. The solid matter is suspended in dilute sodium carbonate solution, the adherent diethylaniline is expelled by steam distillation, the arylide is dissolved in dilute sodium hydroxide solution and precipitated by the addition of dilute acid after the solution has been clarified. The new product very probably corresponds to the formula

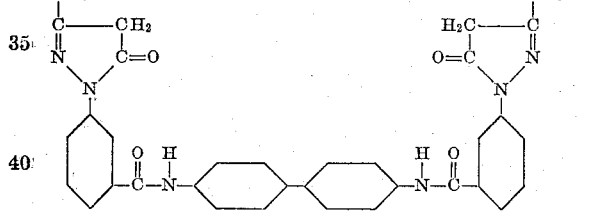

The arylide thus obtained constitutes when dried a yellowish powder which is easily soluble in caustic alkalies; it is absorbed by cotton from its caustic alkali solutions, particularly in the presence of electrolytes.

The condensation may be conducted in an analogous manner with other tertiary bases, such as pyridine, or with the use of indifferent solvents, such as, among others, toluene.

Other products having valuable tinctorial properties are obtained by using intead of the 1-(3'-carboxy-phenyl)-3-methyl-5-pyrazolone another carboxylic acid, such as 1-(4'-carboxy-phenyl)-3-methyl-5-pyrazolone, or the arylide from benzoylacetic ester and para-aminobenzoic acid, or by using instead of benzidine another diamine, such as a phenylenediamine, dianisidine, tolidine, 1:5-naphthylenediamine etc.

Example 4

In a mixing vessel provided with a reflux condenser a mixture of 11.2 parts of 1-phenyl-5-pyrazolone-3-carboxylic acid, and 5.4 parts of para-phenylenediamine in 80 parts of pyridine and 120 parts of diethylamine are heated to 100° C. The whole is allowed to cool down to 80° C., and 2.3 parts of phosphorus trichloride are added in the course of 30 minutes. The temperature is maintained at 80° C. for about 30 minutes, whereupon a further 11.2 parts of 1-phenyl-5-pyrazolone-3-carboxylic acid are added, and the temperature raised to 120–125° C. The condensation takes place in the course of 4 hours at 120–125° C., while gradually adding 3 parts of PCl3. The working up is effected in a similar manner as described in the preceding examples. The new product very probably corresponds to the formula

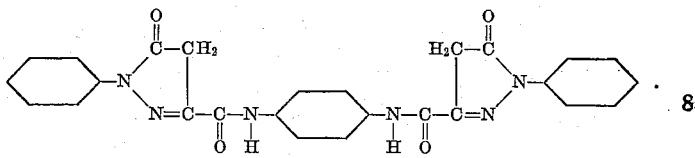

Other condensation products may be obtained by replacing the para-phenylenediamine by other diamines, such as for example 1:5-naphthylenediamine, 4:4'-diaminodiphenyl ether, 4:4'-diamino-diphenylmethane, etc., as well as by replacing the 1-phenyl-5-pyrazolone-3-carboxylic acid by other pyrazolone carboxylic acids, or substituted pyrazolone carboxylic acids. By using two different pyrazolone carboxylic acids unsymmetrical condensation products may be obtained.

Example 5

Cotton yarn is impregnated with a grounding solution prepared by dissolving 6 grams of the condensation product from 1 molecular proportion of 1-(4'-carboxy-phenyl)-3-methyl-5-pyrazolone and 1 molecular proportion of β-naphthylamine in 300 cc of hot water, with the addition of 12 cc. of sodium hydroxide solution of 30 per cent. strength, 10 cc. of Turkey red oil and 15 grams of sodium chloride, the whole being made up to 1 liter by dilution with water. The goods are wound off and developed in a solution, neutralized by means of sodium acetate, containing per liter the diazo-compound from 3 grams of 1-amino-6-methoxy-4-nitrobenzene. The cotton is dyed a pure red-orange having excellent properties of fastness. The new dyestuff very probably corresponds to the formula

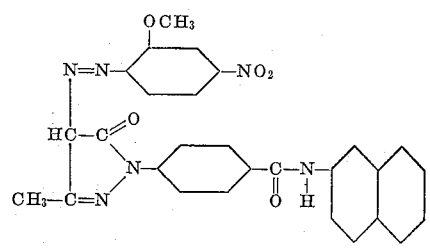

Example 6

Cotton yarn is impregnated with a grounding solution prepared by dissolving 6 grams of the condensation product obtained from 1 molecular proportion of 1-(4'-carboxyl-phenyl)-3-methyl-5-pyrazolone and 1 molecular proportion of 2:7- amino-naphthol in 300 cc. of hot water, with the addition of 12 cc of sodium hydroxide solution of 30 per cent. strength, 10 cc. of Turkey red oil, and 15 grams of sodium chloride, the whole being made up to 1 liter by dilution with water. The goods are wound off and developed in a solution, neutralized with sodium acetate, containing per liter the diazo-compound from 3 grams of 2-amino-4-chlorodiphenylether. The cotton is dyed an orange having excellent properties of fastness. The new dyestuff very probably corresponds to the formula

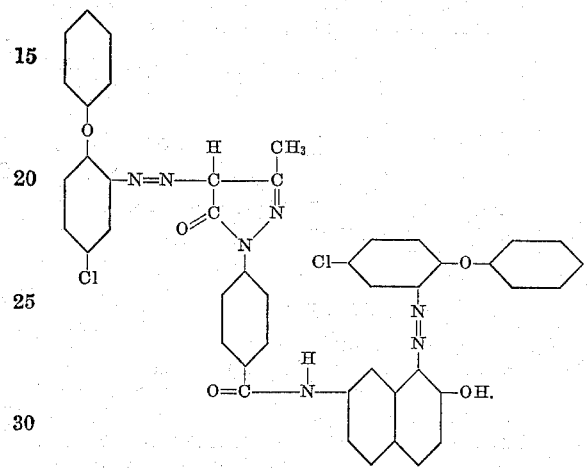

*Example 7*

Wool yarn is treated for ½ hour at ordinary temperature with a grounding solution containing in respect to the weight of the wool:

3 per cent. of the condensation product obtained according to Example 2 from 1-phenyl-5-pyrazolone-3-carboxylic acid and 4-chloro-2-aminodiphenylether, 10 per cent. of Turkey red oil, 15 per cent. of sodium hydroxide solution of 36° Bé., and per liter of the bath 20 cc. of sulfite cellulose waste liquor, and 20 grams of calcined Glauber's salt, the ratio of material to liquor being 1:30. After grounding the goods are hydroextracted and developed in the course of 20 minutes in a diazo-solution, neutralized by means

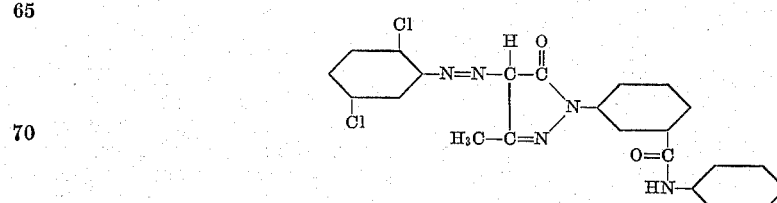

of sodium acetate, containing in respect to the weight of the wood 2 per cent. of ortho-chlordi- azobenzene. A pure yellow dyeing is thus obtained having very good fastness properties. The new dyestuff very probably corresponds to the formula

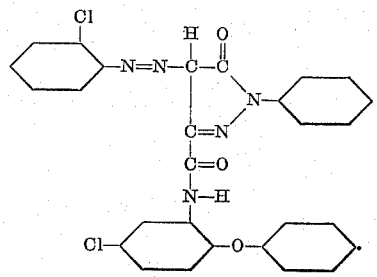

*Example 8*

Cotton yarn is impregnated with a grounding solution prepared by dissolving 6 grams of the condensation product from 2 molecular proportions of 1-(3'-carboxy-phenyl)-3-methyl-5-pyrazolone and 1 molecular proportion of benzidine in 300 cc. of hot water, with the addition of 12 cc. of sodium hydroxide solution of 30 per cent. strength, 10 cc. of Turkey red oil, and 15 grams of common salt, the whole being made up to 1 liter by dilution with water. The goods are wound off and developed in a solution, neutralized by means of sodium acetate, containing per liter the diazo compound from 3 grams of 4-chlor-aminodiphenylether. The cotton is dyed a pure yellow having excellent properties of fastness. The new dyestuff very probably corresponds to the formula

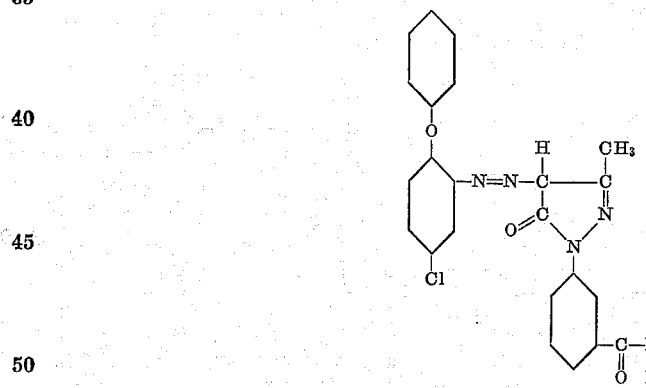

*Example 9*

The material to be printed is padded in the Foulard apparatus in an alkaline solution containing per liter 15 grams of the condensation product from 2 molecular proportions of 1-(3'-carboxy-phenyl)-3-methyl-5-pyrazolone and 1 molecular proportion of para-phenylenediamine. After drying, the goods are printed with a printing color containing per kilo 10 grams of the diazo-product of 2:5-dichloraniline. The yellow color develops rapidly and is very fast. The new dyestuff corresponds very probably to the formula

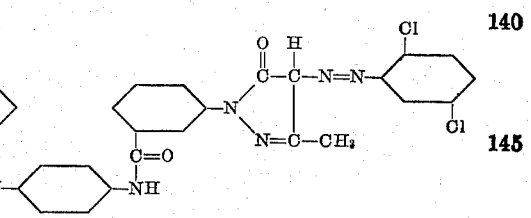

The production of fast tints on the fiber in accordance with the Examples 5 to 9 may further be carried out with the following diazotizing bases:—1-amino-4-methoxy-2-nitrobenzene, 1-amino 3:4-dimethyl-6-chlorobenzene, 1-amino-2 - methyl-4-methoxy - 3:5-dichlorobenzene, 1 - amino - 2:3:5 - trimethyl-4 - chlorobenzene, 1 - amino - 2:5-dimethyl-4-chlorobenzene, 1-amino-3:5-dimethyl-6-chlorobenzene, 1-amino - 6 - methoxy-3:4-dichlorobenzene, 1-amino-6-methyl-2:4 - dichlorobenzene, 1-amino-2:4:5-trichlorobenzene, 1 - amino - 2:4:5 - trimethyl - 3 - chlorobenzene, ortho-aminobenzophenone, 3 - aminodiphenylsulfone, the methyl or ethyl esters of the 1-aminobenzene-2-carboxylic acid, the methyl or ethyl esters of 1-amino-4-chlorobenzene-2-carboxylic acid, the methyl or ethyl esters of 1-amino-5-nitrobenzene-2-carboxylic acid, the methyl and ethyl esters of 1-amino-2-methoxybenzene-5-carboxylic acid, the anilide of 1-amino - 2 - methoxybenzene-5-carboxylic acid, the methyl or ethyl esters of the phenylether of 2-amino-1-hydroxybenzene-4-carboxylic acid, the 4-chlorophenylether of 2 - amino-1-hydroxybenzene-4-carboxylic acid, the 2'-5'-dichlorophenylether of 2-amino-hydroxybenzene-4-carboxylic acid, the phenylether of 2-amino-5-chloro-1-hydroxybenzene-4-carboxylic acid, the anilide of the phenylether of 2-amino-5-chloro-1-hydroxybenzene-4-carboxylic acid, 1- or 2-aminonaphthalene, 1-aminoanthraquinone, etc.

These dyestuffs may of course also be used as colored lacquers and pigments.

There may here also be mentioned the metalliferous dyestuffs obtained by uniting the coupling components mentioned in the preceding examples with unsulfonated diazo-compounds, but containing in ortho-position to the diazo-group an OH- or COOH-group, and subsequent treatment with agents capable of yielding metals (cf. the French Patent 682,706 and its additional Patents 38,707, 38,749, and 39,207). All these unsulfonated dyestuffs may be used in the dyeing of lacquers and nitrocellulose varnishes, or varnishes having as basis other products, such as natural or artificial resins.

*Example 10*

34.6 parts of sulfanilic acid are diazotized in known manner and the excess of mineral acid is neutralized with sodium acetate. The diazo-solution is then introduced into a solution, to which has been added sodium bicarbonate, of 50.8 parts of the condensation product from 1 molecular proportion of para-phenylenediamine and 2 molecular proportions of 1-(3'-carboxyphenyl)-3-methyl-5-pyrazolone, which was itself dissolved with the aid of 8 parts of sodium hydroxide.

After some time the dyestuff which has been formed is separated by filtration. In a dry and pulverized state it constitutes a yellow powder which dissolves in water to a yellow solution. It dyes the fiber yellow shades. On cotton the fastness to light of its dyeings is very good.

By replacing in this example the coupling component by that obtained by condensing 2 mol of (3-carboxy)-phenylbarbituric acid with 1 mol of benzidine, a similar dyestuff is obtained. The new dyestuff has very probably the formula

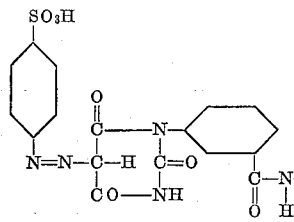 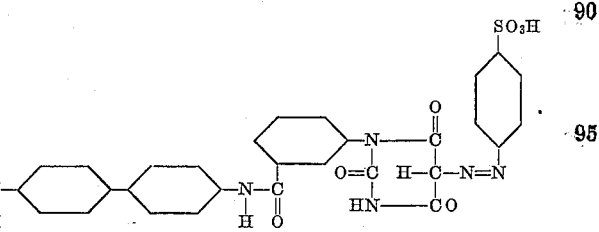

*Example 11*

21.7 parts of 4-sulfo-1-aminobenzene-2-carboxylic acid are diazotized in known manner and the excess of mineral acid is neutralized with sodium acetate. The diazotized mass is introduced into a solution, made alkaline with sodium carbonate, of 29.7 parts of the condensation product from 1 molecular proportion of benzidine and 2 molecular proportions of 1-(3'-carboxyphenyl)-3-methyl-5-pyrazolone.

The dyestuff thus formed is isolated. It very probably corresponds to the formula

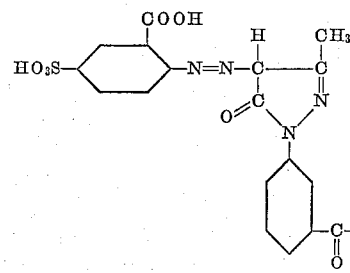 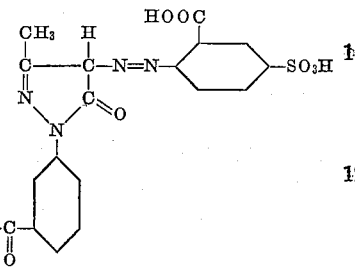

When dry it is a yellow powder, which in the form of its sodium salt is soluble in water and dyes cotton green-yellow, fast tints which, when treated with agents yielding metal, such as copper salts, are excellently fast to light and washing.

If in this example there are used instead of 4-sulfo-1-aminobenzene-2-carboxylic acid the sulfaminosalicylic acid or another ortho-aminophenol-sulfonic acid, or 1-amino-2-hydroxynaphthane-4-sulfonic acid, there are obtained dyestuffs which dye cotton fast orange to red and brown tints, the fastness of which in respect of washing and light may be essentially improved by treatment with agents yielding metals, such as copper salts.

Very interesting dyestuffs are also obtained by replacing the copper by other suitable metals, such as chromium, nickel, cobalt, cerium, vanadium, manganese, etc. These dyestuffs are particularly valuable when isolated in the form of metalliferous dyestuffs. Among these there come into consideration the red chromiferous dyestuffs from pyrazolone derivatives, and the yellow chromiferous dyestuffs from the barbituric acid derivatives or of the arylides of acetylacetic acid.

What we claim is:—

1. Process for the manufacture of azo-dyestuffs, consisting in coupling the arylides of the general formula

R₁—CO—NH—R₂ wherein R₁CO stands for the acyl radical of a carboxylic acid the carboxyl group of which is directly linked to a cyclic nucleus, said nucleus containing a —CH₂—CO— group, and which, due to the presence of the —CH₂—CO—group, is capable of combining with diazo-compounds to produce azo-dyestuffs, and in which R₂ stands for the radical of a polycyclic aromatic amine, with aromatic diazo compounds.

2. Process for the manufacture of azo-dyestuffs, consisting in coupling the arylides of the general formula

R₁—CO—NH—R₂ in which R₁ stands for the radical of a 5-pyrazolone carboxylic acid, and in which R₂ stands for

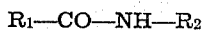

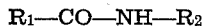

the radical of a polycyclic aromatic amine, with aromatic diazo-compounds.

3. Process for the manufacture of azo-dyestuffs, consisting in coupling the arylides of the general formula

R₁—CO—NH—R₂

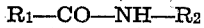

in which R₁ stands for the radical of a 5-pyrazolone carboxylic acid, and in which R₂ stands for the radical of such an aromatic amine which contains two aromatic nuclei bound together by a linkage, with aromatic diazo-compounds.

4. Process for the manufacture of azo-dyestuffs, consisting in coupling the arylides of the general formula

R₁—CO—NH—R₂

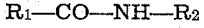

in which R₁ stands for the radical of a 1-phenyl-5-pyrazolone carboxylic acid, and in which R₂ stands for the radical of such an aromatic amine which contains two aromatic nuclei bound together by a linkage, with aromatic diazo-compounds.

5. Process for the manufacture of azo-dyestuffs, consisting in coupling the arylides of the general formula

R₁—CO—NH—R₂ in which R₁ stands for the radical of a 1-phenyl-5-pyrazolone carboxylic acid the COOH-group of which is in the phenyl nucleus, and in which R₂ stands for the radical of such an aromatic amine which contains two aromatic nuclei bound together by a linkage, with aromatic diazo-compounds.

6. Process for the manufacture of azo-dyestuffs, consisting in coupling the arylides of the general formula

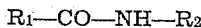

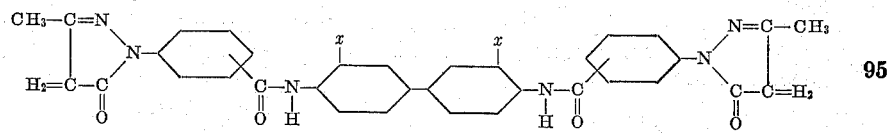

wherein $x$ stands for hydrogen or a substituent of the group consisting of CH₃, OCH₃ and OC₂H₅, with aromatic diazo-compounds.

7. Process for the manufacture of azo-dyestuffs, consisting in coupling the arylides of the general formula

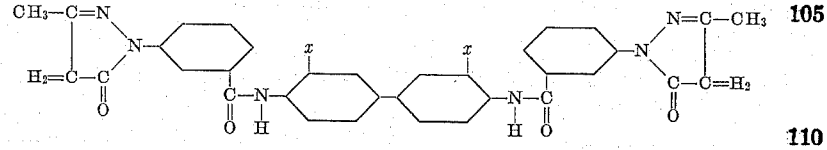

wherein $x$ stands for hydrogen or a substituent of the group consisting of CH₃, OCH₃ and OC₂H₅, with aromatic diazo-compounds.

8. Process for the manufacture of azo-dyestuffs, consisting in coupling the arylides of the general formula

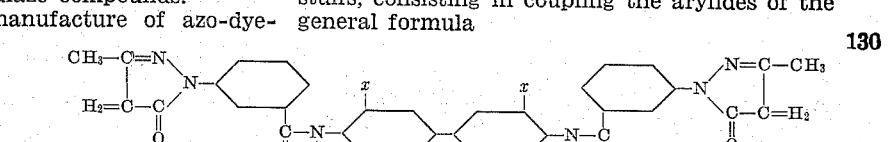

wherein $x$ stands for hydrogen or a substituent of the group consisting of CH₃, OCH₃ and OC₂H₅, with unsulfonated aromatic diazo-compounds.

9. Process for the manufacture of azo-dyestuffs, consisting in coupling the arylides of the general formula

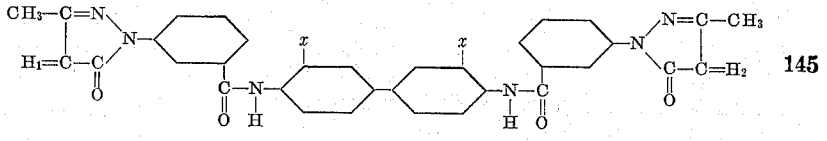

wherein $x$ stands for hydrogen or a substituent of the group consisting of CH₃, OCH₃ and OC₂H₅, with sulfonated aromatic diazo-compounds.

10. Process for the manufacture of azo-dyestuffs, consisting in coupling the arylides of the general formula wherein $x$ stands for hydrogen or a substituent of the group consisting of CH₃, OCH₃ and OC₂H₅, with such sulfonated aromatic diazo-compounds whose o-position to the diazo-group is substituted by a substituent of the group comprising hydroxyl and carboxyl.

11. Process for the manufacture of azo-dyestuffs, consisting in coupling the arylides of the general formula

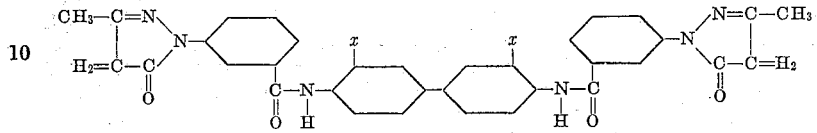

wherein $x$ stands for hydrogen or a substituent of the group consisting of $CH_3$, $OCH_3$ and $OC_2H_5$, with a sulfonated 2-diazo-1-benzene carboxylic acid.

12. Process for the manufacture of azo-dyestuffs, consisting in coupling the arylides of the general formula

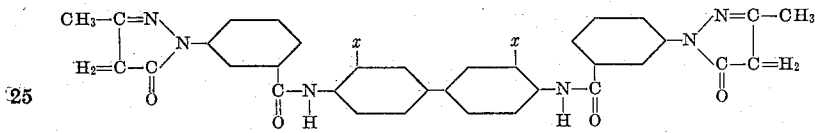

wherein $x$ stands for hydrogen or a substituent of the group consisting of $CH_3$, $OCH_3$ and $OC_2H_5$, with the 5-sulfo-2-diazo-1-benzenecarboxylic acid.

13. Process for the manufacture of azo-dyestuffs, consisting in coupling the arylides of the general formula

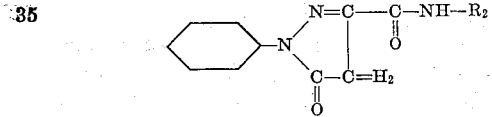

wherein $R_2$ stands for the radical of such an aromatic amine which contains two aromatic nuclei linked by a connecting member, with unsulfonated aromatic diazo-compounds.

14. Process for the manufacture of azo-dyestuffs, consisting in coupling the arylide of the formula

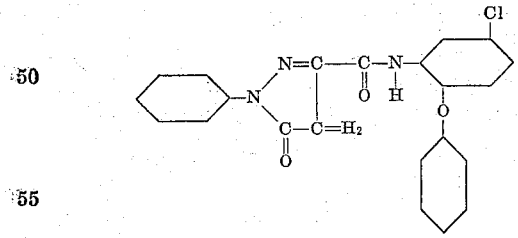

with unsulfonated aromatic diazo-compounds.

15. Process for the manufacture of an azo-dyestuff, consisting in coupling the arylide of the formula

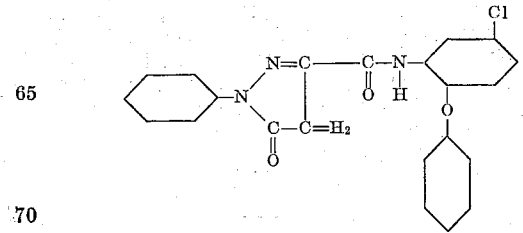

with 2-diazo-4-chloro-1:1'-diphenylether.

16. The azo-dyestuffs characterized by the general formula

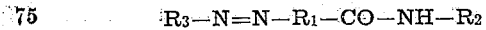

wherein $R_3$ represents the aromatic radical of any diazo-compound, $R_1CO$ represents the acyl radical of a carboxylic acid whose carboxyl group is directly linked to a cyclic nucleus, and whose capacity of coupling with diazo-compounds to produce azo-dyestuffs is due to the presence of

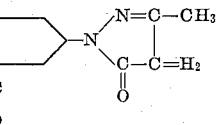

a $—CH_2—CO$ group, and $R_2$ the radical of a polycyclic aromatic amine, which products in a dry state constitute yellow to orange to brown to red powders which dissolve in solvents of the group comprising water and organic solvents to yellow to orange to brown to red solutions.

17. The pyrazolone azo-dyestuffs characterized by the general formula

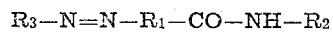

wherein $R_3$ represents the aromatic radical of any diazo-compound, $R_1$ the radical of a 5-pyrazolone carboxylic acid, and $R_2$ the radical of a polycyclic aromatic amine, which products in a dry state constitute yellow to orange to brown to red powders which dissolve in solvents of the group comprising water and organic solvents to yellow to orange to brown to red solutions.

18. The pyrazolone azo-dyestuffs characterized by the general formula

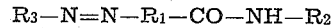

wherein $R_3$ represents the aromatic radical of any diazo-compound, $R_1$ the radical of a 5-pyrazolone carboxylic acid, and $R_2$ the radical of such an aromatic amine which contains two aromatic nuclei bound together by a linkage, which products in a dry state constitute yellow to orange to brown to red powders which dissolve in solvents of the group comprising water and organic solvents to yellow to orange to brown to red solutions.

19. The pyrazolone azo-dyestuffs characterized by the general formula

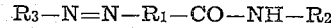

wherein $R_3$ represents the aromatic radical of any diazo-compound, $R_1$ the radical of a 1-phenyl-5-pyrazolone carboxylic acid, and $R_2$ the radical of such an aromatic amine which contains two aromatic nuclei bound together by a linkage, which products in a dry state constitute yellow to orange to brown to red powders which dissolve in solvents of the group comprising water and organic solvents to yellow to orange to brown to red solutions.

20. The pyrazolone azo-dyestuffs characterized by the general formula

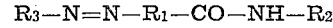

wherein $R_3$ represents the aromatic radical of any diazo-compound, $R_1$ the radical of a 1- phenyl-5-pyrazolone carboxylic acid whose COOH-group is in the phenyl nucleus, and $R_2$ the radical of such an aromatic amine which contains two aromatic nuclei bound together by a linkage, which products in a dry state constitute yellow to orange to brown to red powders which dissolve in solvents of the group comprising water and organic solvents to yellow to orange to brown to red solutions.

21. The pyrazolone azo-dyestuffs characterized by the general formula

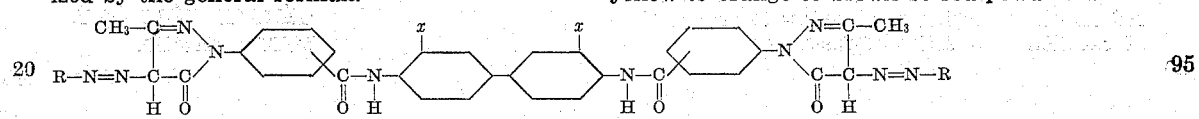

wherein R represents the aromatic radical of any diazo-compound, wherein further $x$ stands for hydrogen or a substituent of the group consisting of $CH_3$, $OCH_3$ and $OC_2H_5$, which products when dry constitute yellow to orange to brown to red powders which dissolve in solvents of the group comprising water and organic solvents to yellow to orange to brown to red solutions.

22. The pyrazolone azo-dyestuffs characterized by the general formula

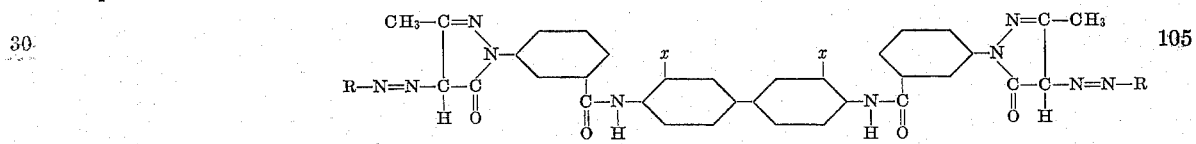

wherein R represents the aromatic radical of any diazo-compound, wherein further $x$ stands for hydrogen or a substituent of the group consisting of $CH_3$, $OCH_3$ and $OC_2H_5$, which products when dry constitute yellow to orange to brown to red powders which dissolve in solvents of the group comprising water and organic solvents to yellow to orange to brown to red solutions.

23. The pyrazolone azo-dyestuffs characterized by the general formula

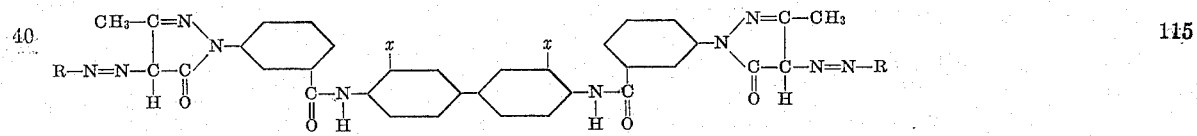

wherein R represents the aromatic radical of an unsulfonated diazo-compound, wherein further $x$ stands for hydrogen or a substituent of the group consisting of $CH_3$, $OCH_3$ and $OC_2H_5$, which products when dry constitute yellow to orange to brown to red powders which dissolve in water to yellow to orange to brown to red solutions, dyeing textiles yellow to orange to brown to red tints which are characterized by their very good properties of fastness.

24. The pyrazolone azo-dyestuffs characterized by the general formula

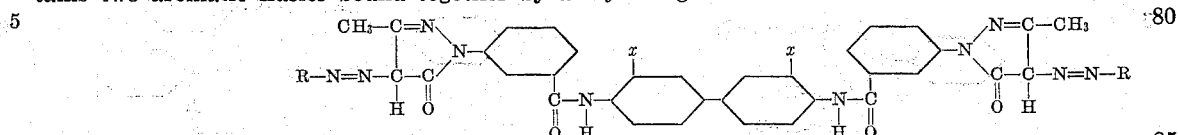

wherein R represents the aromatic radical of such diazo compounds which contain in ortho-position to the diazo-group the OH- or COOH group, wherein further $x$ stands for hydrogen or a substituent of the group consisting of $CH_3$, $OCH_3$ and $OC_2H_5$, which products when dry constitute yellow to orange to brown to red powders which dissolve in water to yellow to orange to brown to red solutions, dyeing textiles yellow to orange to brown to red tints which are characterized by their very good properties of fastness.

25. The pyralzolone azo-dyestuffs characterized by the general formula

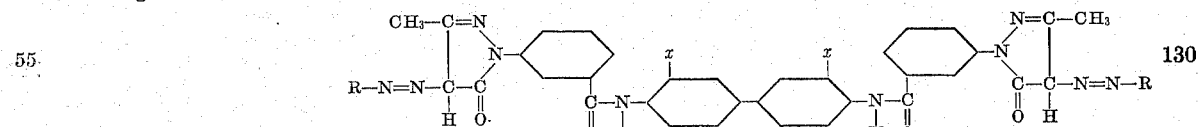

wherein R represents the aromatic radical of a 1-carboxyl-2-diazobenzenesulfonic acid, wherein further $x$ stands for hydrogen or a substituent of the group consisting of $CH_3$, $OCH_3$ and $OC_2H_5$, which products when dry constitute yellow to orange to brown to red powders which dissolve in water to yellow to orange to brown to red solutions, dyeing textiles yellow to orange to brown to red tints which are characterized by their very good properties of fastness.

26. The pyrazolone azo-dyestuffs characterized by the general formula

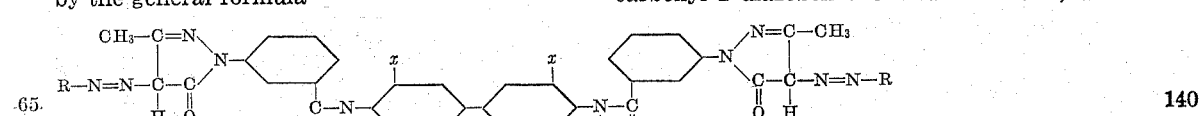

wherein R represents the aromatic radical of the carboxyl-2-diazobenzene-4-sulfonic acid, wherein further $x$ stands for hydrogen or a substituent of the group consisting of $CH_3$, $OCH_3$ and $OC_2H_5$, which products when dry constitute yellow to orange to brown to red powders which dissolve in water to yellow to orange to brown to red solutions, dyeing textiles yellow to orange to brown to red tints which are characterized by their very good properties of fastness.

27. The pyrazolone azo-dyestuffs characterized by the general formula

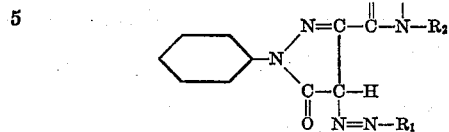

wherein $R_1$ represents the radical of an unsulfonated aromatic diazo-compound, and $R_2$ the radical of such an aromatic monamine which contains two aromatic nuclei linked by a connecting member, which products in a dry state constitute yellow to orange to brown powders which dissolve in organic solvents to yellow to orange and red solutions, dyeing wool yellow to orange tints of excellent properties of fastness.

28. The pyrazolone azo-dyestuff of the formula

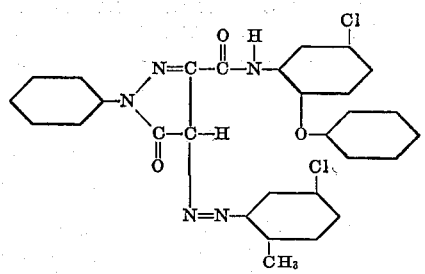

which in a dry state constitutes an orange powder, dissolves in organic solvents to a yellow solution, and when produced on wool dyes the same fast reddish yellow tints.

GÉRALD BONHÔTE.
MAX SCHMID.